US011023681B2

(12) United States Patent
Lassoued et al.

(10) Patent No.: US 11,023,681 B2
(45) Date of Patent: Jun. 1, 2021

(54) CO-REFERENCE RESOLUTION AND ENTITY LINKING

(71) Applicant: INTERNATIONAL BUSINESS MACHINES CORPORATION, Armonk, NY (US)

(72) Inventors: Yassine Lassoued, Dublin (IE); Lea Deleris, Paris (FR); Stephane Deparis, Mulhuddart (IE); Killian Levacher, Dublin (IE); Charles A. Jochim, Dublin (IE); Yufang Hou, Dublin (IE); Elizabeth Daly, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/136,064

(22) Filed: Sep. 19, 2018

(65) Prior Publication Data

US 2020/0089766 A1    Mar. 19, 2020

(51) Int. Cl.
*G06F 40/30* (2020.01)
*G06F 16/36* (2019.01)
*G06F 40/284* (2020.01)

(52) U.S. Cl.
CPC .......... *G06F 40/30* (2020.01); *G06F 16/367* (2019.01); *G06F 40/284* (2020.01)

(58) Field of Classification Search
USPC .................................... 704/1–504; 434/156
See application file for complete search history.

(56) References Cited

U.S. PATENT DOCUMENTS

| 7,813,916 | B2 | 10/2010 | Bean | |
|---|---|---|---|---|
| 8,200,671 | B2 | 6/2012 | Labrou et al. | |
| 8,594,996 | B2 * | 11/2013 | Liang | G06F 40/10 704/9 |
| 9,092,517 | B2 * | 7/2015 | Paparizos | G06F 16/374 |
| 9,229,924 | B2 * | 1/2016 | Sun | G06F 40/242 |
| 9,535,902 | B1 | 1/2017 | Michalak et al. | |
| 9,594,831 | B2 * | 3/2017 | Wang | G06F 40/295 |
| 9,600,566 | B2 * | 3/2017 | Ganti | G06F 40/247 |
| 9,613,004 | B2 * | 4/2017 | Liang | G06F 40/10 |
| 9,864,795 | B1 | 1/2018 | Halevy et al. | |
| 9,904,667 | B2 * | 2/2018 | Kalyanpur | G06F 40/211 |
| 9,910,844 | B2 * | 3/2018 | Kalyanpur | G06F 16/3329 |
| 10,032,131 | B2 * | 7/2018 | Cheng | G06Q 10/10 |
| 10,089,809 | B1 * | 10/2018 | Daly | G06Q 10/00 |
| 10,282,389 | B2 * | 5/2019 | Liang | G06F 40/295 |
| 10,354,465 | B2 * | 7/2019 | Daly | G07C 9/00309 |

(Continued)

OTHER PUBLICATIONS

Soraluze et al., "Enriching Basque Coreference Resolution System using Semantic Knowledge sources," Proceedings of the 2nd Workshop on Coreference Resolution Beyond OntoNotes (CORBON 2017), Apr. 4, 2017 (9 pages).

(Continued)

*Primary Examiner* — Marcus T Riley
(74) *Attorney, Agent, or Firm* — Griffiths & Seaton PLLC

(57) ABSTRACT

Embodiments for co-reference resolution and entity linking from unstructured text data by a processor. Semantic co-references and mentions of one or more entities may be resolved occurring in unstructured text data by linking the one or more entities using a domain knowledge ontology.

20 Claims, 11 Drawing Sheets

(56) References Cited

U.S. PATENT DOCUMENTS

| | | | | |
|---|---|---|---|---|
| 2009/0144609 | A1* | 6/2009 | Liang | G06F 40/10 715/230 |
| 2010/0131516 | A1 | 5/2010 | Jean-Mary | |
| 2014/0142922 | A1* | 5/2014 | Liang | G06F 40/295 704/9 |
| 2016/0147763 | A1* | 5/2016 | Kalyanpur | G06F 16/3344 707/728 |
| 2016/0147871 | A1* | 5/2016 | Kalyanpur | G06F 40/284 707/728 |
| 2017/0262412 | A1* | 9/2017 | Liang | G06F 40/10 |
| 2018/0197088 | A1* | 7/2018 | Bonin | G06N 5/025 |
| 2018/0349514 | A1* | 12/2018 | Alzate Perez | G06F 16/24522 |
| 2018/0349517 | A1* | 12/2018 | Kleiman-Weiner | G06F 16/904 |
| 2018/0365920 | A1* | 12/2018 | Daly | G07C 9/00571 |
| 2019/0102462 | A1* | 4/2019 | Botea | H04L 67/10 |
| 2019/0205395 | A1* | 7/2019 | Bonin | G06F 16/345 |
| 2019/0220695 | A1* | 7/2019 | Nefedov | G06F 16/38 |
| 2019/0325325 | A1* | 10/2019 | Monteil | G08G 1/096844 |
| 2019/0347363 | A1* | 11/2019 | Kishimoto | G06N 5/04 |
| 2020/0012954 | A1* | 1/2020 | Botea | G06N 5/04 |
| 2020/0082016 | A1* | 3/2020 | Lassoued | G06N 5/04 |
| 2020/0089766 | A1* | 3/2020 | Lassoued | G06F 40/237 |

OTHER PUBLICATIONS

Ratinov et al., "Learning-based Multi-Sieve Co-reference Resolution with Knowledge," Proceedings of the 2012 Joint Conference on Empirical Methods in Natural Language Processing and Computational Natural Language Learning, Jul. 2012 (11 pages).

Hajishirzi et al., "Joint Coreference Resolution and Named-Entity Linking with Multi-pass Sieves," Proceedings of the 2013 Conference on Empirical Methods in Natural Language Processing, Oct. 18-21, 2013 (11 pages).

Fonseca et al., "Improving Coreference Resolution with Semantic Knowledge," 2016 (12 pages).

Vermaas et al., "An Ontology-Based Approach for Product Entity Resolution on the Web," 2014 (15 pages).

Prokofyev et al., "SANAPHOR: Ontology-Based Coreference Resolution," 2015 (16 pages).

Thi et al., "Ontology-Based Entity Coreference Resolution for Sentiment Analysis," SoICT '17, Dec. 7-8, 2017 (7 pages).

* cited by examiner

700

The Political candidate told the news : His father left Country B around 1958 or 1959, but in October 2011, the Newspaper reported documents of John and Jane Doe, indicating they had become Country A residents in May 1956. At his campaign speech in City, State, Jack Doe said: "Both of my parents were born to poor families in Country B. After his mother died when he was nine, my father left school to go work. My mother was one of seven girls raised by a disabled father who struggled to provide for his family."

JACK DOE    JOHN DOE    JANE DOE

The Political candidate told the news : His father left Country B around 1958 or 1959, but in October 2011, the Newspaper reported documents of John and Jane Doe, indicating they had become Country A residents in May 1956. At his campaign speech in City, State, Jack Doe said: "Both of my parents were born to poor families in Country B. After his mother died when he was nine, my father left school to go work. My mother was one of seven girls raised by a disabled father who struggled to provide for his family."

FIG. 8

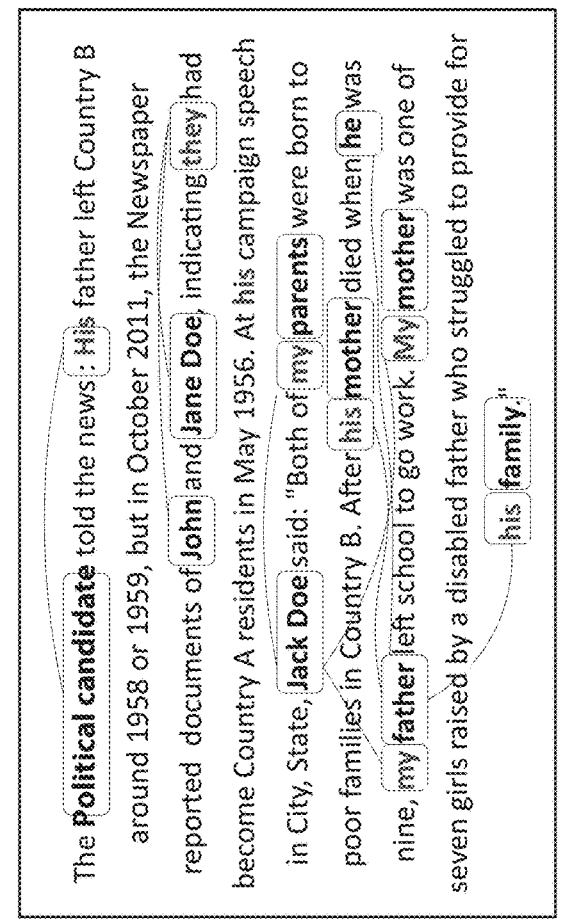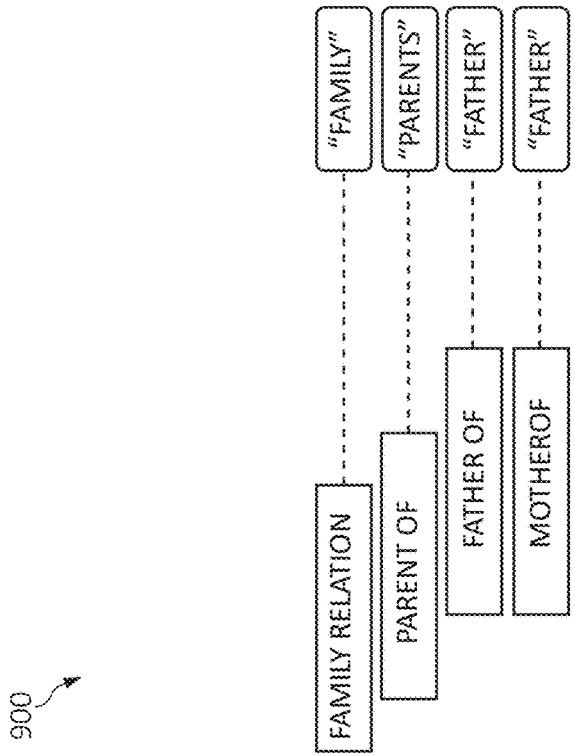
FIG. 9

INPUT TEXT (1202)

The Political candidate told the news: "His father left Country B around 1958 or 1959, but in October 2011, the Newspaper reported documents of John and Jane Doe, indicating they had become Country A residents in May 1956. At his campaign speech in City, State, Jack Doe said: "Both of my parents were born to poor families in Country B. After his mother died when he was nine, my father left school to go work. My mother was one of seven girls raised by a disabled father who struggled to provide for his family."

DESIRED OUTPUT (1204)

| SPAN | REFERENCE/MENTION | MATCHING ENTITY IDS |
|---|---|---|
| [14, 34] | POLITICAL CANDIDATE | JACK DOE |
| [89, 99] | HIS FATHER | JOHN DOE |
| [282, 287] | JOHN | JOHN DOE |
| [292, 305] | JANE DOE | JANE DOE |
| [318, 322] | THEY | JOHN DOE, JANE DOE |
| [365, 368] | HIS | JACK DOE |
| [404, 415] | JACK DOE | JACK DOE |
| [431, 441] | MY PARENTS | JACK DOE |
| [484, 494] | HIS MOTHER | UNKNOWN |
| [505, 507] | HE | JOHN DOE |
| [518, 527] | MY FATHER | JOHN DOE |
| [552, 561] | MY MOTHER | JANE DOE |
| [606, 512] | FATHER | UNKNOWN |

CO-REFERENCE RESOLUTION AND ENTITY LINKING

BACKGROUND OF THE INVENTION

Field of the Invention

The present invention relates in general to computing systems, and more particularly to, various embodiments for co-reference resolution and entity linking from unstructured text data using a computing processor.

Description of the Related Art

Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment.

SUMMARY OF THE INVENTION

Various embodiments for co-reference resolution and entity linking from unstructured text data by a processor, are provided. In one embodiment, by way of example only, a method for co-reference resolution and entity linking from unstructured text data, again by a processor, is provided. Semantic co-references and mentions of one or more entities may be resolved occurring in unstructured text data by linking the one or more entities using a domain knowledge ontology.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a diagram depicting an exemplary operation for co-reference resolution in accordance with aspects of the present invention;

FIG. 8 is a diagram depicting semantic reference identification in accordance with aspects of the present invention;

FIG. 9 is a diagram depicting semantic relationship identification in accordance with aspects of the present invention;

FIG. 12 is a diagram depicting co-reference resolution and entity linking from unstructured text data using matching entity identifiers (ID) according to an embodiment of the present invention.

DETAILED DESCRIPTION OF THE DRAWINGS

Figure 1:
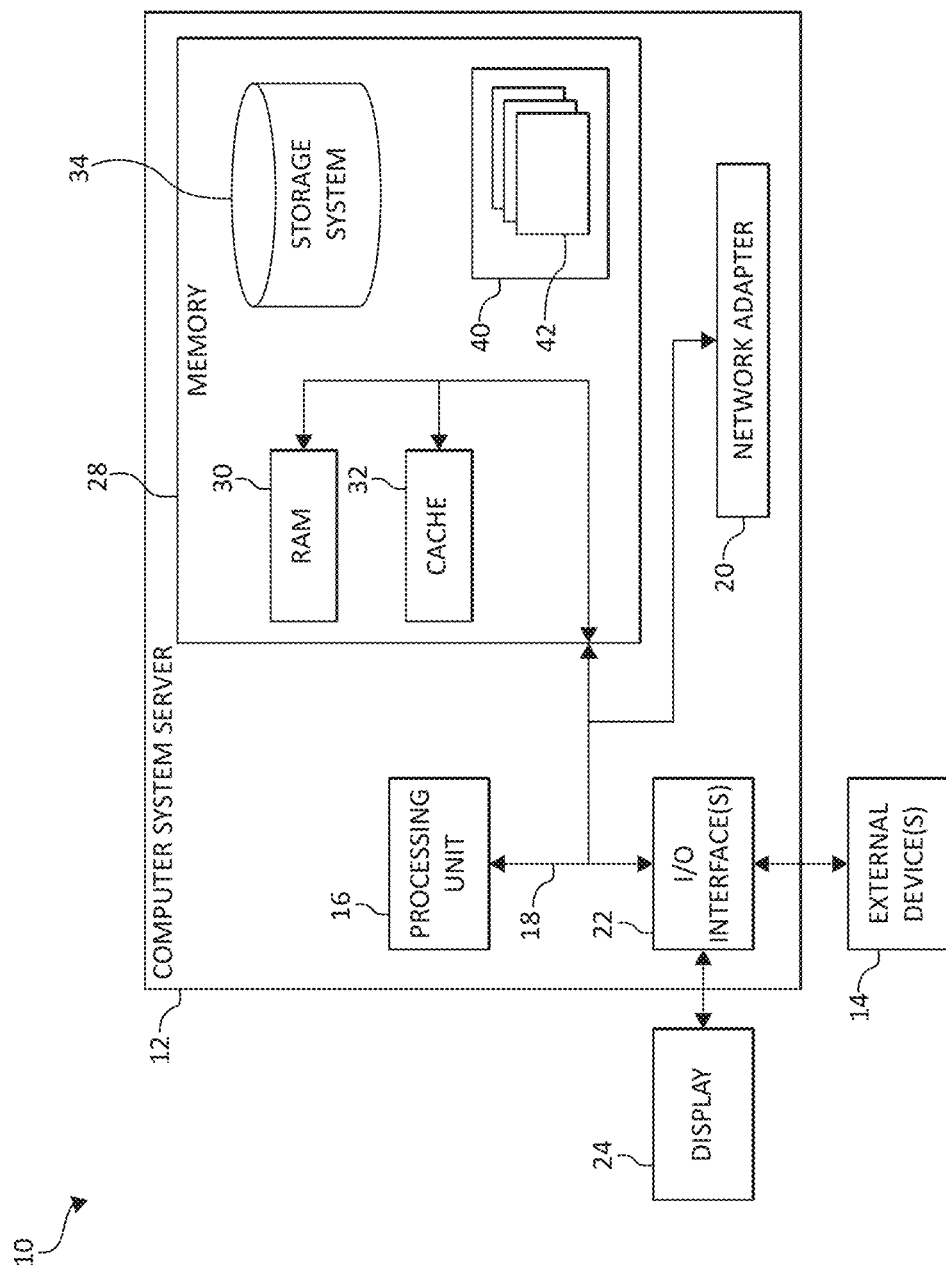
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of the behavior of groups or individuals in a population, including scientific, political, governmental, educational, financial, travel, traffic flow, shopping and leisure activities, healthcare, and so forth. Many data-intensive applications require the extraction of information from data sources, such as, for example, within the political, security and counter terrorism, healthcare, government, educational, or business environment.

Co-reference resolution is the task of identifying linguistic expressions (mentions) that refer to the same real-world entity in natural language. A natural language processing ("NLP") may be able to accurately resolve certain types of co-references, such as anaphora, cataphora, or antecedents. However, NLP operations are currently challenged with noun phrase co-references.

As such, there is a need to resolve nontrivial, semantic co-references occurring in natural text using a domain knowledge ontology (e.g., social network) using entity properties (e.g., names, labels, types, roles, synonyms, etc.) and entity relationships (e.g., social relationships) and their properties (e.g., names, labels, synonyms, etc.). Thus, the present invention provides for resolving person/entity co-references using a domain knowledge ontology such as, for example, a social network that may be applied to any domain where the entities of interest, entity properties, and relationships (e.g., semantic relationships) can be captured in the ontology. That is, semantic co-references and mentions of one or more entities occurring in unstructured text data may be resolved by linking the one or more entities using a domain knowledge ontology. In one aspect, the text data, which may be unstructured text data, may be processed such that one or more indications or "mentions" of the one or more entities may be automatically identified/spotted/extracted from the text data for resolving the semantic co-references between one or more entities.

In one aspect, a cognitive system may receive text data expressed in natural language and a domain ontology that includes a set of entities of interest, semantic types of the entities, data properties, and relationships. The cognitive system may provide a set of entity annotations each consisting of a span of a mention in the input text and/or one or several matching entities (e.g., entity IDs) from the domain ontology with a matching score. In one aspect, the domain knowledge ontology may be provided by an external source such as, for example, a domain database "DBPedia" or may be populated from the input text under consideration. That is, the DBPedia may represent structured knowledge from one or more online data sources (e.g., Internet/Wikipedia) using semantic web expressions.

As used herein an entity (e.g., a concept, individual, instance, etc.) may be the formalization of a real or virtual thing and/or an idea, such as a given person or organization. A semantic type or class may be a category of entities/concepts/individuals/instances that share something in common (e.g., a semantic type) such as, for example, a person, man, a woman, an animal, an organization. A property may be a data field (e.g., a textual data field) associated with entities of a given type such as, for example, a person's first name, nickname, job, and/or an acronym of an organization. A relationship may be a binary link between a source entity and a target entity such as, for example, "father of," "friend of," "director of," "pet of," etc. An ontology may be a collection of entities, their semantic types, properties, and relationships. A lexicon may be a model learned for spotting/identifying mentions of entities (e.g., semantic references to an entity) from a knowledge domain (e.g., ontology). In one aspect, "mention" is a term intended to have its ordinary meaning. For example, a "mention" may refer to something/someone briefly and without going into detail and/or an act or an instance of citing or calling attention to someone or something especially in a casual or incidental manner.

Thus, in one aspect, a cognitive system may learn/determine one or more ontology inferences to infer new relationships and properties of the entities. A lexicon of entities may be learned from the ontology using entity names, labels, and properties (e.g., job, role, nickname, etc.). A lexicon of relationship types may be learned from a semantic network (e.g., mother of, father of, etc.). A co-reference resolution may be applied. The entity lexicon may be used to spot entity mentions and link the mentioned entities to the relevant entities. A relationship lexicon may be used to spot mentions, following or preceding possessives (e.g., my dad, the father of X, X's father, etc.) and link the mentioned relationships to the relevant ontology relationships. The results from the co-reference resolution, entity linking, and relationship linking may be used, in conjunction with the ontological relationships between entities, to completely/entirely resolve semantic references.

In one aspect, the term "domain" is a term intended to have its ordinary meaning. In addition, the term "domain" can include an area of expertise for a system or a collection of material, information, content and/or other resources related to a particular entity or subject or subjects relating to the entities. A domain can refer to information related to any particular entity and associated data that may define, describe, and/or provide a variety of other data associated with one or more entities. The domain can refer to can also refer to subject matter or a combination of selected subjects.

Also, in another aspect, the term ontology in its broadest sense may include anything that can modeled as ontology, including but not limited to, taxonomies, thesauri, vocabularies, and the like. For example, an ontology may include information or content relevant to a domain of interest or content of a particular class or concept. Content can be any searchable information, for example, information distributed over a computer-accessible network, such as the Internet. A concept can generally be classified into any of a number of concepts which may also include one or more sub-concepts. Examples of concepts may include, but are not limited to, scientific information, healthcare information, medical information, biomedical information, business information, educational information, commerce information, financial information, political information, pricing information, information about individual people, cultures, groups, sociological groups, market interest groups, institutions, universities, governments, teams, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
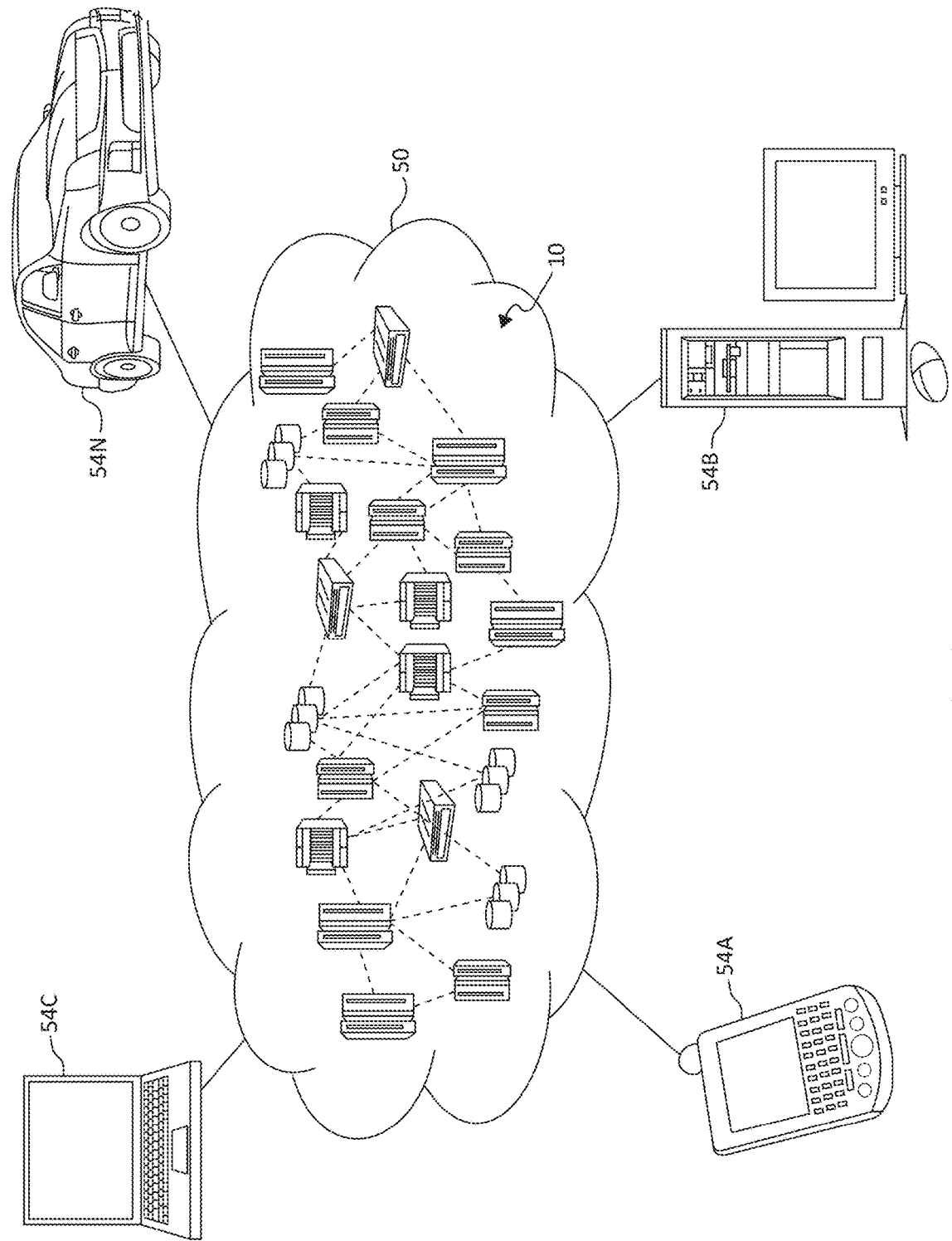
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
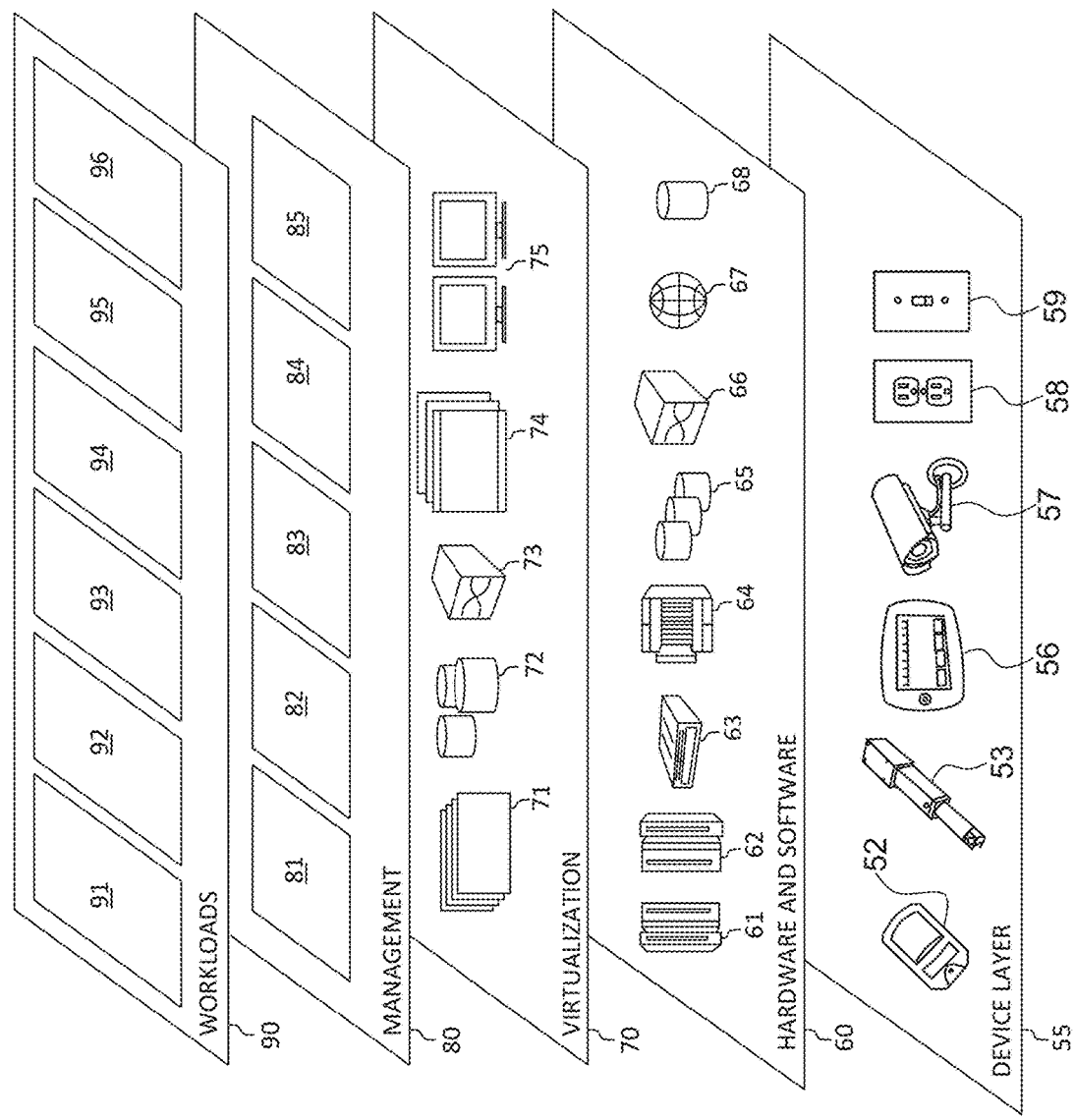
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various co-reference resolution and entity linking workloads and functions 96. In addition, co-reference resolution and entity linking workloads and functions 96 may include such operations as data analysis (including data collection and processing from various environmental sensors), and predictive data analytics functions. One of ordinary skill in the art will appreciate that the co-reference resolution and entity linking from unstructured text data workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
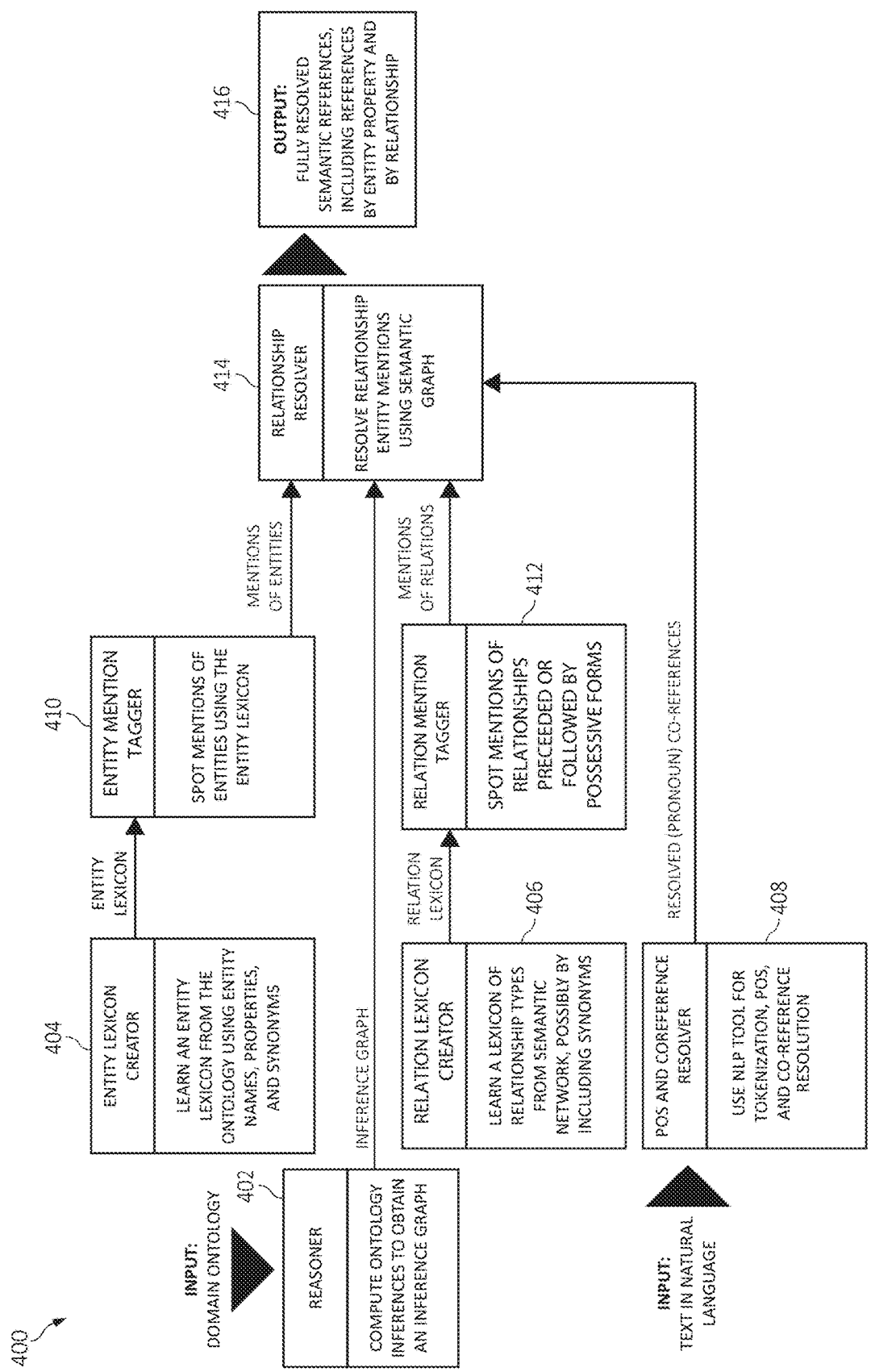
FIG. 4 is a block diagram depicting co-reference resolution and entity linking from unstructured text data according to an embodiment of the present invention.

FIG. 4 is an additional conceptual diagram depicting various functional blocks for co-reference resolution and entity linking from unstructured text data in accordance with aspects of the present invention. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system in accordance with the present invention. For example, computer system/server 12 of FIG. 1 may be employed in FIG. 4, incorporating processing unit 16 to perform various computational, data processing and other functionality in accordance with various aspects of the present invention. In one aspect, each of the blocks 400 may be performed in parallel, in sequence, and/or iteratively.

By way of example only, various computational, data processing and other functionality workflow is depicted. That is, co-reference resolution and entity linking from unstructured text data is depicted. In one aspect, the present invention may include using a domain ontology by an ontology reasoner for determining ontology inferences to obtain an inference graph, as in block 402.

An entity lexicon creator may learn and/or create an entity lexicon from an ontology using entity names, properties (e.g., job, role, nickname, etc.), and/or synonyms, as in block 404. The entity lexicon creator may use an external knowledge, such as thesauri or dictionaries.

A relation lexicon creator (e.g., relationship lexicon creator) may be used for learning and/or creating relationship lexicons from an ontology and possibly external knowledge, such as thesauri or dictionaries to learn a lexicon of relationship types from a semantic network (e.g., mother of, father of, etc.), which may include synonyms, as in block 406. That is, the relationship lexicon creator may use relationship lexicon to identify/spot mentions, following or preceding possessives (e.g., my dad, the father of X, X's father, etc.) and link them to the relevant ontology relationships.

In one aspect, a lexicon is a model learned for identifying/ spotting mentions of entities or relationships (e.g., identifying semantic references of entities and/or relationships) from the knowledge domain. The lexicon may include, but not limited to, a collection of potential term matches per entity or relationship, with a matching score (or confidence score). For example of the entity John Doe: "John Doe" may be assigned a 1.0, "John" may be assigned a 0.5, "Doe" may be assigned 0.5, "senator" may be assigned 0.1, and "political party" may be assigned 0.1. As an additional example of a relationship lexicon, "father of" may assign father "father" 0.9, "dad" may be assigned 0.9, "Sir" may be assigned 0.1, and the like.

For learning lexicons, learning an entity or relationship lexicon may be based on the entity or relationship properties. Synonyms may be added from an external source (e.g., thesaurus, DBPedia, etc.). Lexicons may be learned based on information retrieval (IR) techniques. The IR techniques may include 1) creating an index of the target entities or relationships using their properties, each entity or relationship being considered as a document, and each property as a field, and/or 2) computing the Term-frequency-inverse document frequency (e.g., "TF-IDF") similarity between each relevant term occurring in the document fields and the document itself, and may include different weights associated with the fields, which may be the matching score between the term and the document (entity or relationship).

A TF-IDF is an operation that measures the importance of words in a collection of documents. Said differently, the TF-IDF is a numerical statistic that is intended to reflect how important a word is to a document in a collection or corpus. The TF-IDF operation may provide TF-IDF vector representations of entity descriptions and the vectors may be compared to identify similarities between the documents.

An NLP-based co-reference resolver (e.g., parts of speech "POS" and co-reference resolver) may use one or more NLP operations (e.g., an NLP tool) for tokenization, POS, and co-reference resolution, as in block 408. The NLP-based co-reference resolver may also resolve pronoun references.

An entity mention tagger may spot mentions of ontology entities and link the "mentions" to the relevant ontology entities using the entity lexicon, as in block 410. A relationship mention tagger may spot mentions of relationships and links them to the relevant ontology relationships, as in block 412.

A relationship resolver may be used for resolving relationship entity mentions using a semantic graph, as in block 414. That is, the relationship resolver may be used for compiling all results from co-reference resolution, entity linking, and relationship linking, in conjunction with the ontological relationships between entities, to fully resolve semantic references (via a semantic graph), as in block 416 (e.g., completely/fully resolved semantic references and references by entity property and entity relationship). That is, the output may be a set of entity annotations each containing a span of mentions in the input text and/or one or several matching entities (e.g., entity IDs) from the domain ontology with a matching score.

Figure 5:
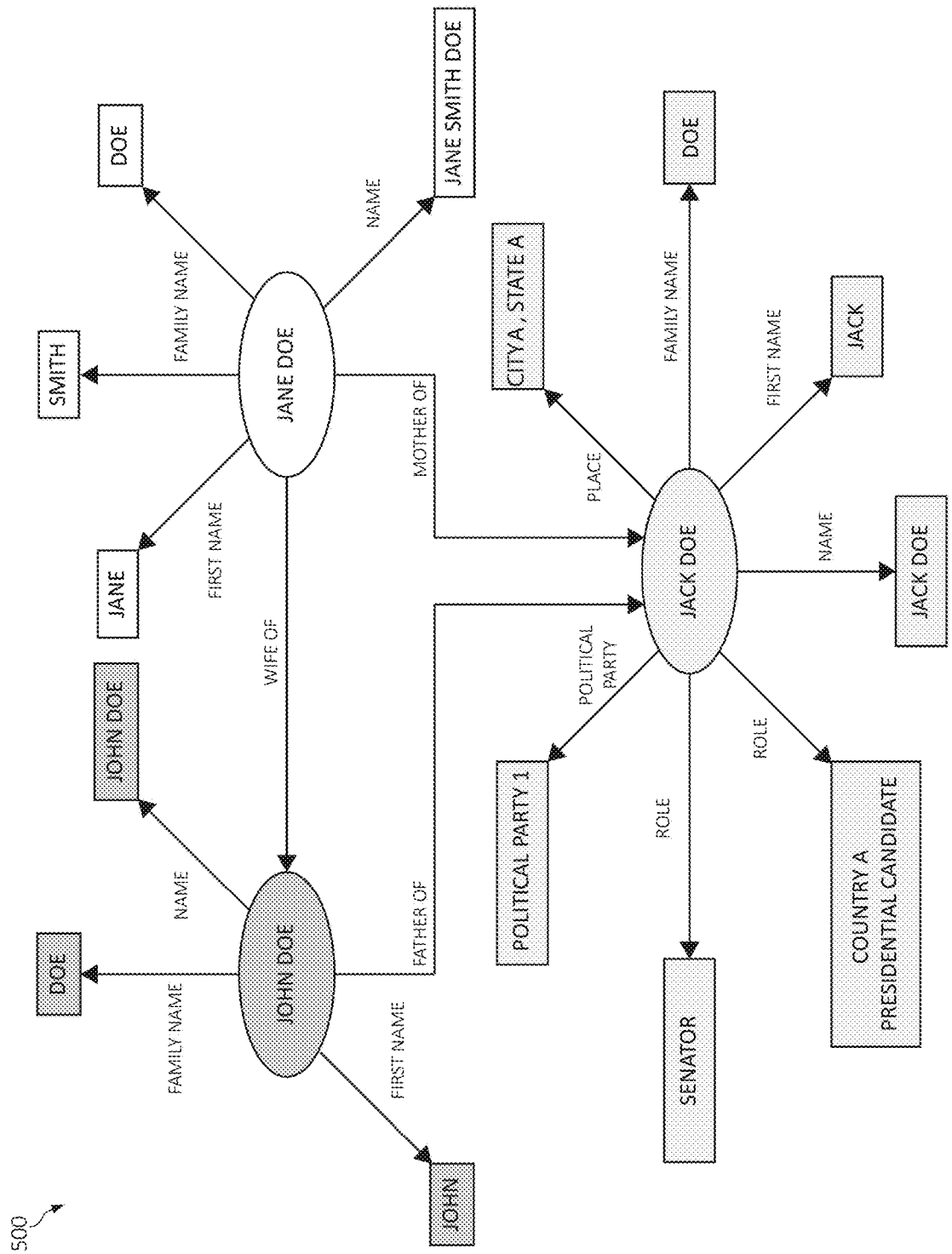
FIG. 5 is a diagram depicting a domain ontology in accordance with aspects of the present invention.

Turning now to FIG. 5, diagram 500 depicts an exemplary domain ontology. The domain ontology may include a set of entities of interest, semantic types of the entities, data properties, and relationships. For example, the semantic types of the entities may be a person which may be a man or woman. The relationships may include, for example, a spouse of (reflexive) that may be a wife of (e.g., inverse of husband of) and husband of (inverse of wife of), a parent of (e.g., inverse of child of) (e.g., a mother of or a father of). The relationships may include a child of (e.g., inverse of parent of) such as, for example, a son of and daughter of. The domain ontology may also include one or more axioms such as, for example the form of (i) (?x :parent ?y) (?y :parent of ?z)→(?x :grandparent ?z) or (ii) (?x :child of ?y) (?x rdf:type :Man)→(?x :son of ?y), where (i) reads as if x is the parent of y and y the parent of z then it can be inferred that x is the grand parent of Z and (ii) reads as if x is child of y and x is a man then x is the son of y.

For example, John Doe may be a father of Jack Doe. John Doe may have a last name of "Doe." Jack Doe may be a presidential candidate for Country A. Jack Doe may live in City A, of State A. Jack Doe has a family name of "Doe." Jane Doe may be a wife of John Doe. Jane Doe may have a first name of "Jane" and a last name of "Doe." Jane Doe may also have a middle or maiden name of "Smith." Thus, the domain ontology provides for a set of entities of interest, semantic types of the entities, data properties, and relationships. Each indication or mention of the entity by name, role, gender, or alternative names may be extracted from the text data and annotated to each specific, identified entity.

Figure 6:
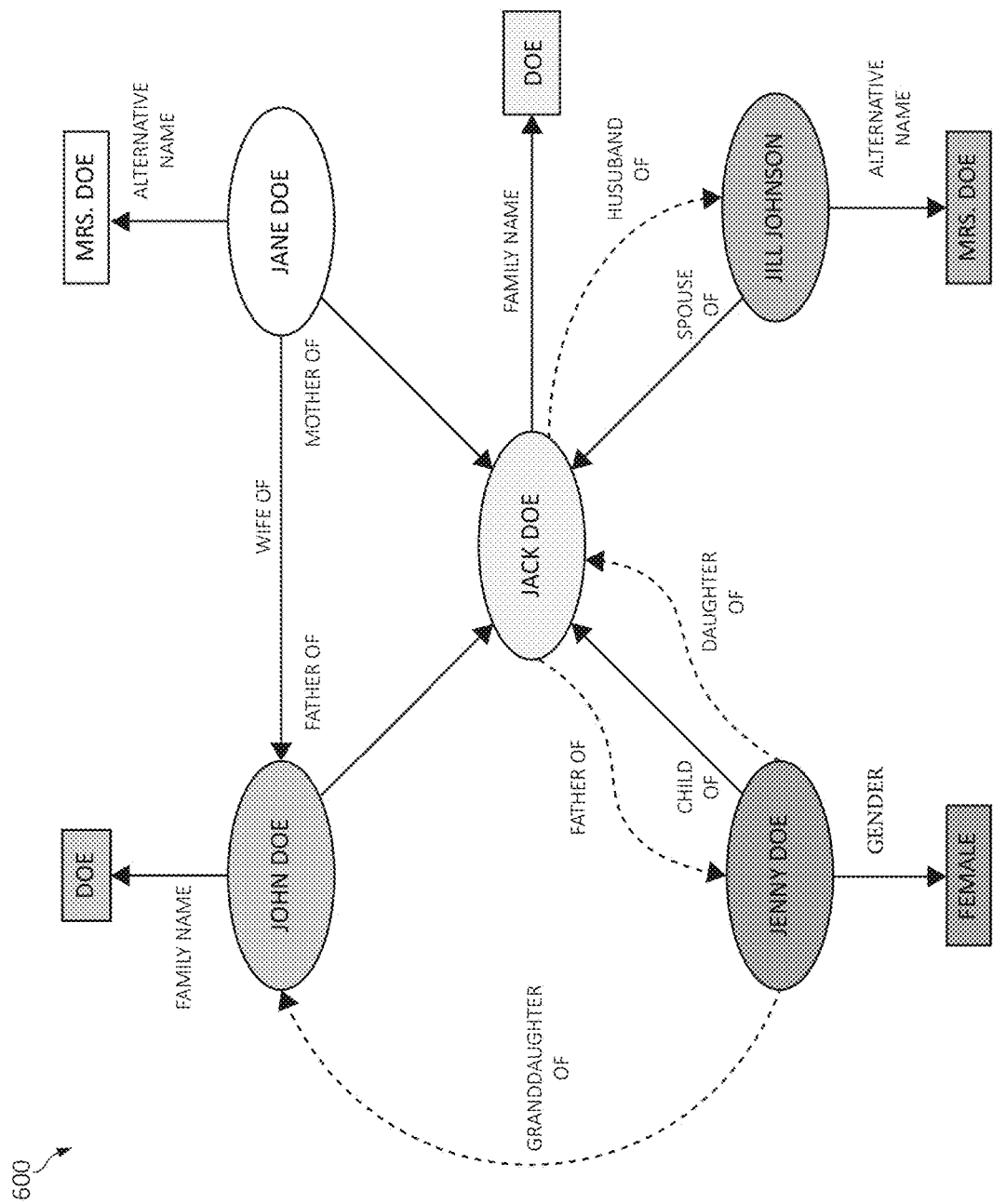
FIG. 6 is a diagram depicting an ontology inference of relationships and properties in accordance with aspects of the present invention.

Turning now to FIG. 6, diagram 600 depicts an exemplary graph of ontology inference of relationships and properties. The "dashed lines" indicate examples of inferred statements and the solid lines indicate asserted statements from a domain database (e.g., DBPedia).

That is, one or more new ontology relationships and properties using axioms may be determined and/or inferred. For example, transitive relationships, inverse relationships, and/or other relationships using custom domain rules may be used to infer ontology relationships and properties. For example, transitive relationships may be inferred if X is descendant of Y, and Y is descendant of Z, then X is descendant of Z. An inverse relationships may be inferred if X is husband of Y, then Y is wife of X. If X is son of Y, then Y is parent of X. The custom domain rules may indicate that: 1) if X (e.g., Jack Doe) is child of Y (John Doe), and X is male, then X is son of Y, 2) if X is a brother of Y, and Y is parent of Z, then X is uncle of Z, and/or 3) if X's family name is f, and Y is wife of X, then Y's alternative label is "Mrs." And "f" For example, John Doe has a family last name of "Doe" and is the husband of Jane Doe. Thus, Jane Doe may have an alternative label of Mrs. Doe.

FIG. 7 is a diagram 700 depicting an exemplary operation for co-reference resolution. The text with annotated and additional entity information, as described above, may be used to resolve co-reference (e.g., pronoun references). For example, "John Doe" may be identified as a reference with the pronouns "him" or "His" or "John" and "Jane Doe" with the pronouns "they" and the like. More specifically, the co-reference resolution operation may include replacing a shorted indication (e.g., a pronoun "his" of the entity "John Doe") with an entity identifier (ID), which may be the entities' name itself or an assigned ID, referring to the entity. Thus, output data provides improved annotated text data with co-references that have been resolved.

In one aspect, the co-reference resolution operation may be defined as the process of establishing that two expressions refer to the same referent, without necessarily establishing what that referent is. Reference resolution may be the process of establishing what/who the referent is. To further illustrate, expressions that are co-referential can be referred to as aliases of one another. For examples, expressions "Political Candidate," "his," "my," and "Jack Doe" form an alias cluster referring to Jack Doe.

FIG. 8 illustrates a diagram 800 of semantic reference identification. For example, an entity lexicon may be used to spot one or more entity mentions (e.g., Jack Doe, John Doe, and/or Jane Doe) and link the one or more entity mentions to one or more relevant entities (e.g., his, my, they, etc.).

FIG. 9 illustrates a diagram 900 of semantic relationship identification. For example, a relationship lexicon may be used to spot one or more semantic relationship mentions and link the one or more semantic relationship mentions to one or more relevant ontology relationships such as, for example, family, parents, father, and mother. For example, the term "parents" in the text is linked with the ontology relationship "parents of."

Figure 10:
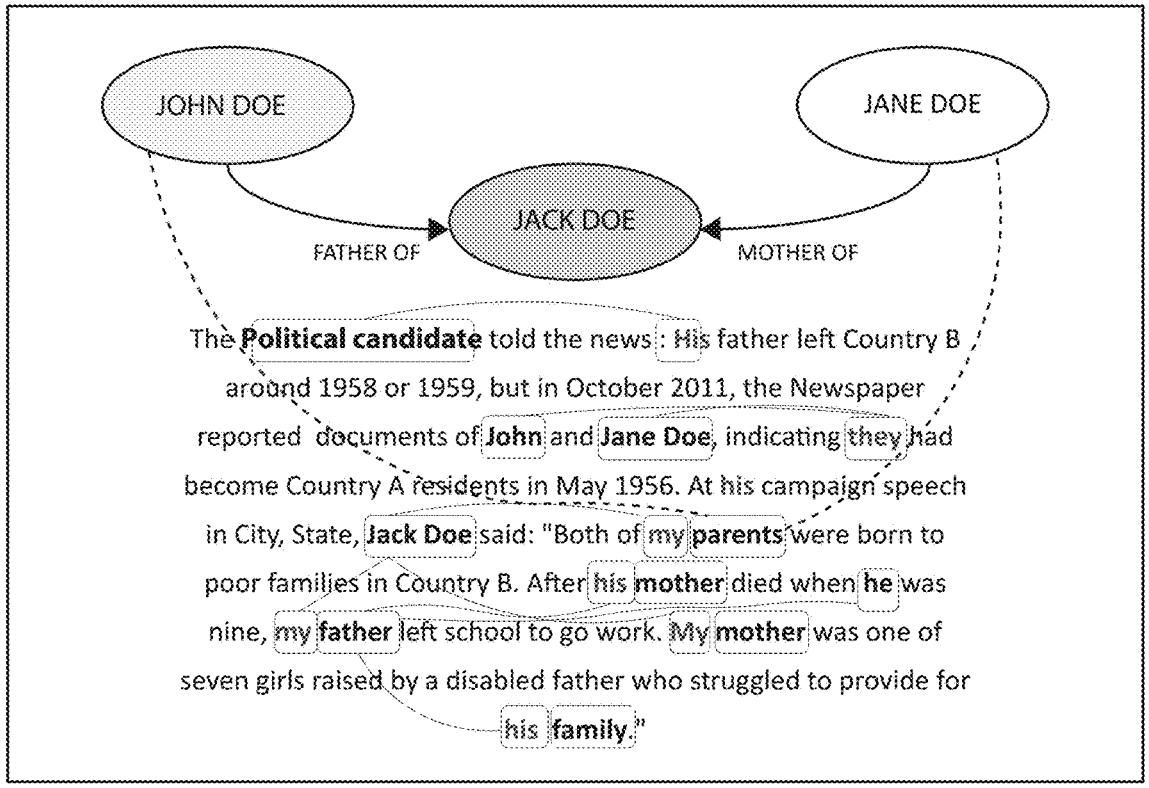
FIG. 10 is a diagram depicting resolving semantic references using relationship results from co-reference resolution, entity linking, and relationship linking along with using ontological relationships between entities in accordance with aspects of the present invention.

FIG. 10 is an additional diagram depicting resolving semantic references using relationship results from co-reference resolution, entity linking, and relationship linking along with using ontological relationships between entities. That is, relationships results from co-reference resolution, entity linking, and relationship linking may be used in conjunction with the ontological relationships between entities to fully resolve semantic references. It should be noted that if the semantic graph included, for example, Jack Doe's grandparents, then the operations of resolving relationship mentions may also include resolving the relationship mentions in the text such as, for example, in the text "After his mother died . . . ," which refers to Jack Does' grandmother.

Thus, the present invention provides a cognitive system for resolving non-trivial semantic co-references occurring in natural text using a domain ontology (e.g., social network). A text expressed in natural language and/or a domain ontology comprising set of entities of interest, their semantic types, data properties, and relationships may be received as input. A set of entity annotations each comprising a span of a mention in the input text and/or one or more or several matching entities (entity IDs) from the domain ontology, which may include their matching scores.

Figure 11:
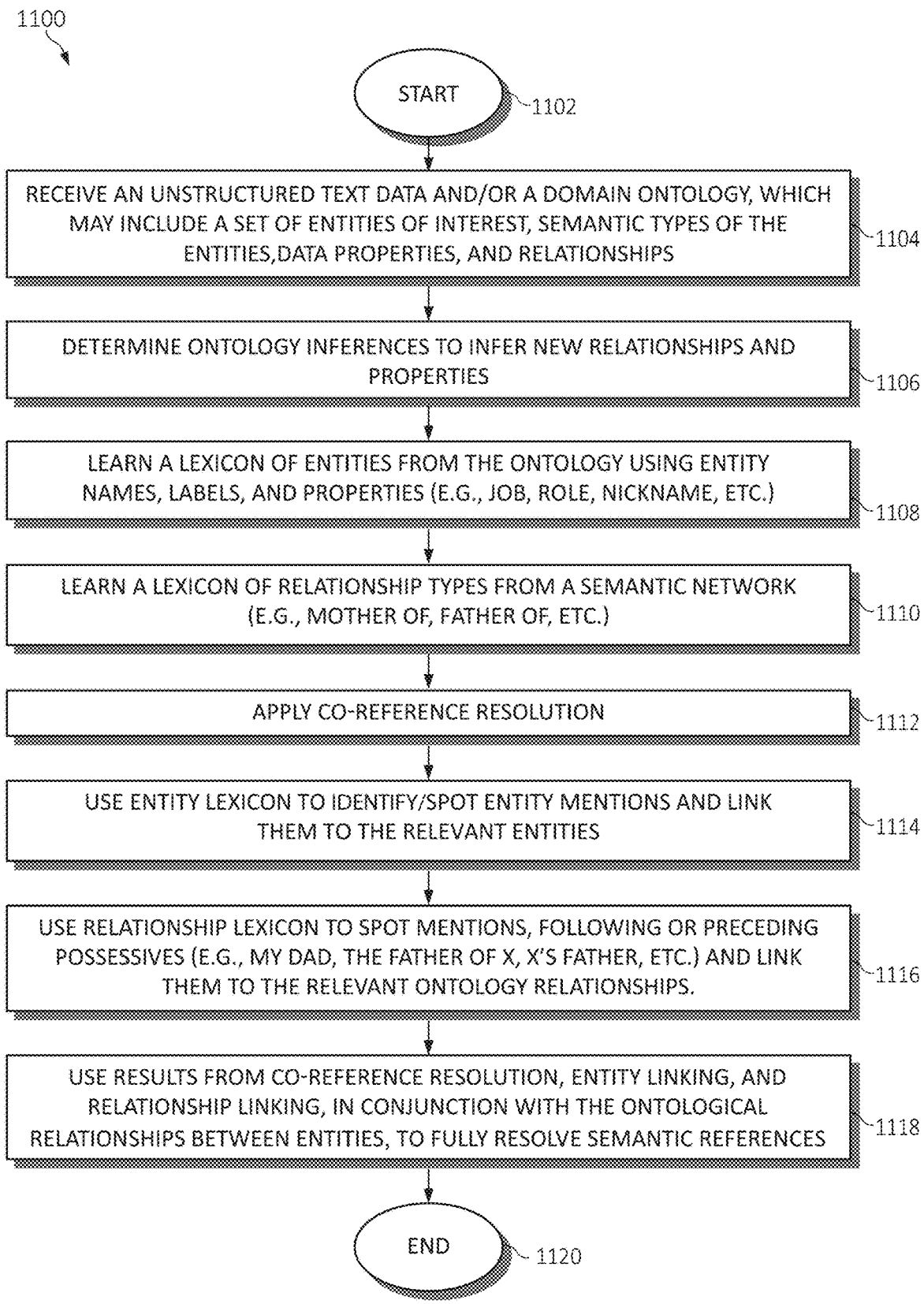
FIG. 11 is a flowchart diagram depicting an exemplary method for performing co-reference resolution and entity linking from unstructured text data by a processor; again in which aspects of the present invention may be realized.

Turning now to FIG. 11, a method 1100 for co-reference resolution and entity linking from unstructured text data by a processor is depicted, in which various aspects of the illustrated embodiments may be implemented. That is, FIG. 11 is a flowchart of an additional example method 1100 for discovery, characterization, and analysis of interpersonal relationships from unstructured text data in a computing environment according to an example of the present invention. The functionality 1100 may be implemented as a method executed as instructions on a machine, where the instructions are included on at least one computer readable medium or one non-transitory machine-readable storage medium. The functionality 1100 may start in block 1102.

The functionality 1100 may receive an unstructured text data and/or a domain ontology, which may include a set of entities of interest, semantic types of the entities, data properties, and relationships, as in block 1104. One or more ontology inferences may be determined to infer new relationships and properties, as in block 1106. A lexicon of entities may be learned from the ontology using entity names, labels, and properties (e.g., job, role, nickname, etc.), as in block 1108. A lexicon of relationship types may be learned from a semantic network (e.g., mother of, father of, etc.), as in block 1110. A co-reference resolution may be applied/performed, as in block 1112. An entity lexicon may be used to identify/spot entity mentions and link them to the relevant entities, as in block 1114. A relationship lexicon may be used to identify/spot mentions, following or preceding possessives (e.g., his dad, the father of X, X's father, etc.) and link the possessives to the relevant ontology relationships, as in block 1116. The results of the co-reference resolution, entity linking, and relationship linking, in conjunction with the ontological relationships between entities, to fully resolve semantic references, as in block 1118. The functionality 1110 may end, as in block 1120. The functionality 1100 may end, as in block 1120.

In one aspect, in conjunction with and/or as part of at least one block of FIG. 11, the operation of 1100 may include one or more of each of the following. The operation of 1100 may link the one or more entities to the extracted text data to create the relationship between one or more entities and extracted text data using the knowledge graph, and/or associate an entry in the knowledge graph to each of the one or more entities in the extracted text data.

The operation of 1100 may use the domain knowledge ontology, which defines a plurality of entities, semantic types of entities, properties of the plurality of entities, a relationships between the plurality of entities. The operation of 1100 may identify and learn an entity lexicon from the domain knowledge ontology, and identify and learn a lexicon of relationships from the domain knowledge ontology. A co-reference resolution may be performed for the one or more entities referenced in the unstructured text data using an entity lexicon, a lexicon of relationships, or a combination thereof from the domain knowledge ontology.

The operation of 1100 may use an entity lexicon to identify one or more semantic entity references in the unstructured text data and linking the one or more semantic entity references to the one or more entities; and use lexicon of relationships to identify one or more semantic relationship references in the unstructured text data and linking the one or more semantic relationship references to the one or more entities.

The operation of 1100 may aggregate results of a co-reference resolution operation, an entity linking operation, and a relationship linking operation along with ontological relationships references between the one or more entities in a semantic graph for resolving semantic co-references between the one or more entities.

Turning now to FIG. 12, diagram 1200 depicts a final output of co-reference resolution and entity linking from unstructured text data using matching entity identifiers (ID). That is, using the various embodiments as described herein (e.g., operations of FIG. 4) the input text 1202 may be received. Diagram 1200 illustrates the output 1204 for resolving semantic co-references and mentions of one or more entities occurring in unstructured text data by linking the one or more entities using a domain knowledge ontology. As depicted, output 1204 may be a table with a span (e.g., character location in a series of text such as, for example, the $14^{th}$ character and ending at the $34^{th}$ character), reference/mention, and matching entity IDs. In one aspect, the span may indicate the location of the mentioned entity such as, for example, "political candidate" is a mentioned entity starting/ending at characters 14 and 34. The matching Entity ID for the mentioned entity "political candidate" may be "John Doe."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for co-reference resolution and entity linking from unstructured text data, comprising:
resolving semantic co-references and mentions of one or more entities occurring in unstructured text data by linking the one or more entities using a domain knowledge ontology, wherein the one or more entities are linked in a table within the domain knowledge ontology inclusive of an entity identifier (ID) assigned to each of the one or more entities, a referent description of the mentions of the one or more entities, and a character span of beginning and ending character locations within the unstructured text data of the mentions of the one or more entities.

2. The method of claim 1, further including defining the domain knowledge ontology to include a plurality of entities, semantic types of entities, properties of the plurality of entities, a relationships between the plurality of entities.

3. The method of claim 1, further including identifying and learning an entity lexicon from the domain knowledge ontology.

4. The method of claim 1, further including identifying and learning a lexicon of relationships from the domain knowledge ontology.

5. The method of claim 1, further including performing a co-reference resolution for the one or more entities referenced in the unstructured text data using an entity lexicon, a lexicon of relationships, or a combination thereof from the domain knowledge ontology.

6. The method of claim 1, further including:
using an entity lexicon to identify one or more semantic entity references in the unstructured text data and linking the one or more semantic entity references to the one or more entities; and
using lexicon of relationships to identify one or more semantic relationship references in the unstructured text data and linking the one or more semantic relationship references to the one or more entities.

7. The method of claim 1, further including aggregating results of a co-reference resolution operation, an entity linking operation, and a relationship linking operation along with ontological relationships references between the one or more entities in a semantic graph for fully resolving the semantic co-references between the one or more entities.

8. A system for co-reference resolution and entity linking from unstructured text data, comprising:
one or more computers with executable instructions that when executed cause the system to:
resolve semantic co-references and mentions of one or more entities occurring in unstructured text data by linking the one or more entities using a domain knowledge ontology, wherein the one or more entities are linked in a table within the domain knowledge ontology inclusive of an entity identifier (ID) assigned to each of the one or more entities, a referent description of the mentions of the one or more entities, and a character span of beginning and ending character locations within the unstructured text data of the mentions of the one or more entities.

9. The system of claim 8, wherein the executable instructions define the domain knowledge ontology to include a plurality of entities, semantic types of entities, properties of the plurality of entities, a relationships between the plurality of entities.

10. The system of claim 8, wherein the executable instructions identify and learn an entity lexicon from the domain knowledge ontology.

11. The system of claim 8, wherein the executable instructions identify and learn a lexicon of relationships from the domain knowledge ontology.

12. The system of claim 8, wherein the executable instructions perform a co-reference resolution for the one or more entities referenced in the unstructured text data using an entity lexicon, a lexicon of relationships, or a combination thereof from the domain knowledge ontology.

13. The system of claim 8, wherein the executable instructions:
use an entity lexicon to identify one or more semantic entity references in the unstructured text data and linking the one or more semantic entity references to the one or more entities; and
use lexicon of relationships to identify one or more semantic relationship references in the unstructured text data and linking the one or more semantic relationship references to the one or more entities.

14. The system of claim 8, wherein the executable instructions aggregate results of a co-reference resolution operation, an entity linking operation, and a relationship linking operation along with ontological relationships references between the one or more entities in a semantic graph for resolving the semantic co-references between the one or more entities.

15. A computer program product for, by a processor, co-reference resolution and entity linking from unstructured text data, the computer program product comprising a non-transitory computer-readable storage medium having computer-readable program code portions stored therein, the computer-readable program code portions comprising:
an executable portion that resolves semantic co-references and mentions of one or more entities occurring in unstructured text data by linking the one or more entities using a domain knowledge ontology, wherein the one or more entities are linked in a table within the domain knowledge ontology inclusive of an entity identifier (ID) assigned to each of the one or more entities, a referent description of the mentions of the one or more entities, and a character span of beginning and ending character locations within the unstructured text data of the mentions of the one or more entities.

16. The computer program product of claim 15, further including an executable portion that defines the domain knowledge ontology to include a plurality of entities, semantic types of entities, properties of the plurality of entities, a relationships between the plurality of entities.

17. The computer program product of claim 15, further including an executable portion that:
   identifies and learns an entity lexicon from the domain knowledge ontology; and
   identifies and learns a lexicon of relationships from the domain knowledge ontology.

18. The computer program product of claim 15, further including an executable portion that performs a co-reference resolution for the one or more entities referenced in the unstructured text data using an entity lexicon, a lexicon of relationships, or a combination thereof from the domain knowledge ontology.

19. The computer program product of claim 15, further including an executable portion that:
   uses an entity lexicon to identify one or more semantic entity references in the unstructured text data and linking the one or more semantic entity references to the one or more entities; and
   uses lexicon of relationships to identify one or more semantic relationship references in the unstructured text data and linking the one or more semantic relationship references to the one or more entities.

20. The computer program product of claim 15, further including an executable portion that aggregates results of a co-reference resolution operation, an entity linking operation, and a relationship linking operation along with ontological relationships references between the one or more entities in a semantic graph for resolving the semantic co-references between the one or more entities.

* * * * *